H. C. HUNTER, DEC'D.
A. HUNTER, ADMINISTRATRIX.
TUBE HEADING MACHINE.
APPLICATION FILED SEPT. 26, 1902. RENEWED NOV. 6, 1908.
906,885.
Patented Dec. 15, 1908.
3 SHEETS—SHEET 1.
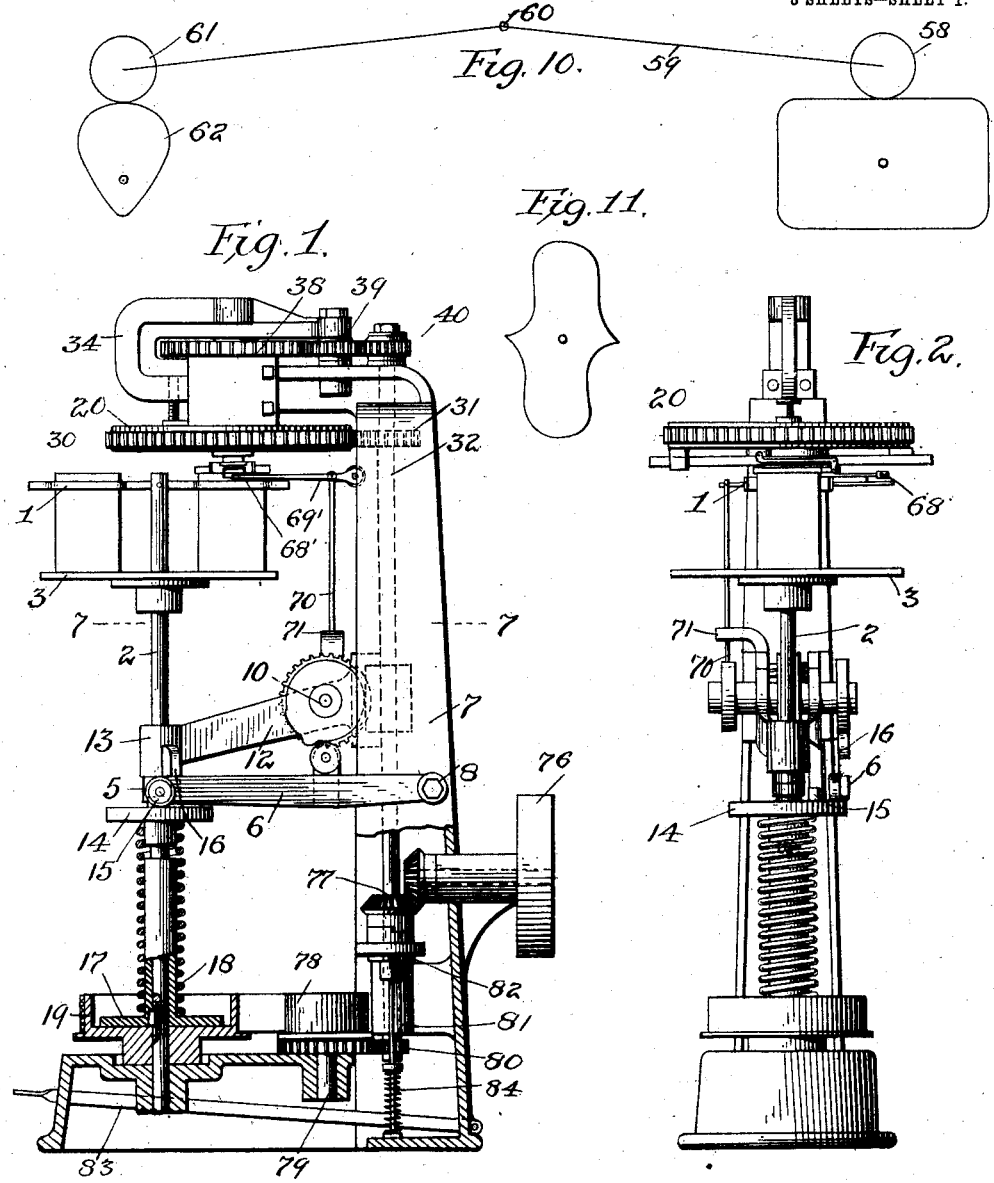
Attest
L. B. Middleton
R. E. Ourand
Inventor
Henry C. Hunter
by Ellis Spear & Company
Attys.

H. C. HUNTER, DEC'D.
A. HUNTER, ADMINISTRATRIX.
TUBE HEADING MACHINE.
APPLICATION FILED SEPT. 26, 1902. RENEWED NOV. 6, 1908.
906,885.
Patented Dec. 15, 1908.
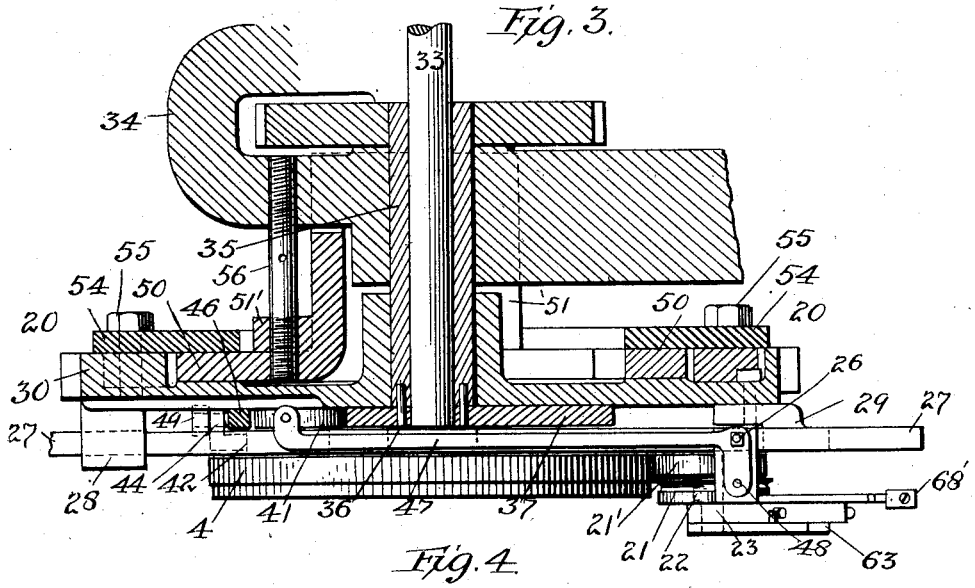
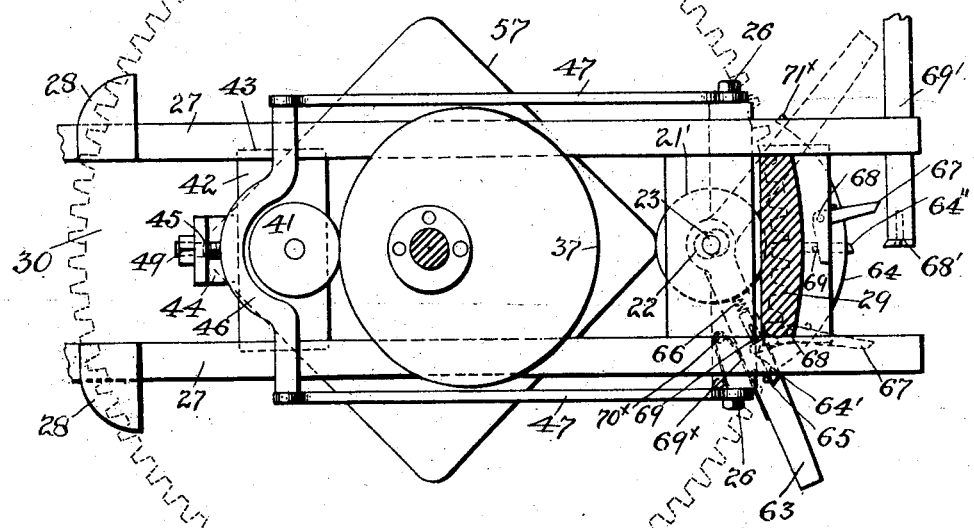
Attest
[signatures]
Edward Sarton
Inventor
Henry C. Hunter
by Ellis Spear & Company
Attys H. C. HUNTER, DEC'D.
A. HUNTER, ADMINISTRATRIX.
TUBE HEADING MACHINE.
APPLICATION FILED SEPT. 26, 1902. RENEWED NOV. 6, 1908.
906,885.
Patented Dec. 15, 1908.
3 SHEETS—SHEET 3.
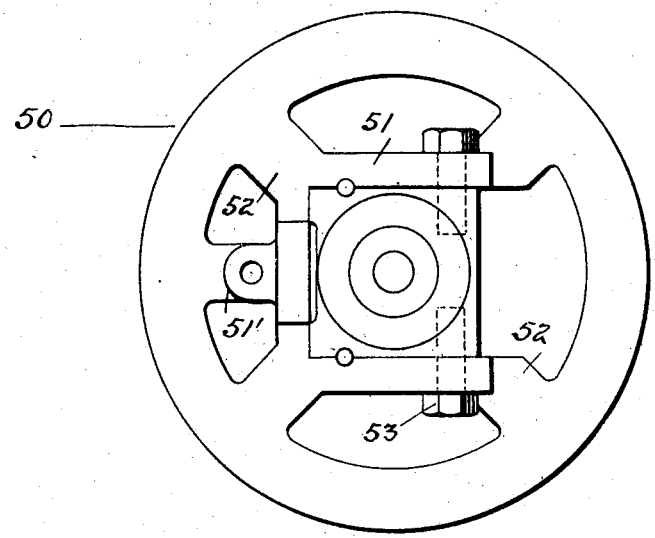
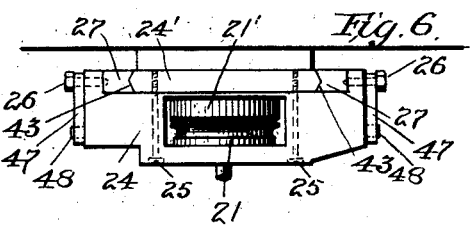
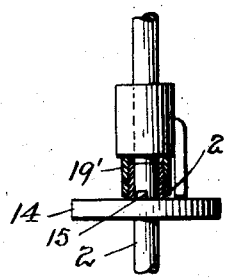
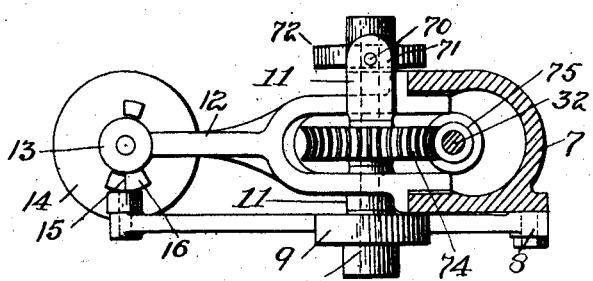
Attest
S. B. Middleton
N. E. Durand
Inventor
Henry C. Hunter
by Ellis Spear + Company
Attys.

UNITED STATES PATENT OFFICE.

HENRY C. HUNTER, OF JERSEY CITY, NEW JERSEY; AGNES HUNTER ADMINISTRATRIX OF SAID HENRY C. HUNTER, DECEASED.

TUBE-HEADING MACHINE.

No. 906,885.            Specification of Letters Patent.         Patented Dec. 15, 1908.

Application filed September 26, 1902, Serial No. 124,992. Renewed November 6, 1908. Serial No. 461,380.

*To all whom it may concern:*

Be it known that I, HENRY C. HUNTER, citizen of the United States, residing at Jersey City, Hudson county, New Jersey, have invented certain new and useful Improvements in Tube-Heading Machines, of which the following is a specification.

My invention is a machine for beading the metal rims of heads upon tubes, more especially those made of fiber board, to form containers or cans for packing.

My machine includes a head carrying a beading wheel and continuously revolving with said wheel about a stationary chuck, the beading wheel being set up to its work and withdrawn therefrom by automatically operating means acting to positively advance and retract the seaming wheel the predetermined amount.

The machine also includes a feeding table adapted to remove the finished can, and supply parts of a new one to the working parts rapidly and automatically, giving the operator as much time to feed the machine as the work itself requires, the discharge and feeding in taking place within one revolution of the head and not requiring the same to intermit, one revolution only of the head being made with the beading wheel retracted.

My invention consists in the features and combination and arrangement of parts hereinafter described and particularly pointed out in the claims.

In the accompanying drawings: Figure 1 is a side view of the invention with parts in section and parts omitted. Fig. 2 is a front view. Fig. 3 is a detail sectional view of the head, parts being shown in elevation. Fig. 4 is a plan view of parts shown in Fig. 3. Fig. 5 is a plan view of the supporting means of the head. Fig. 6 is a detail view relating to the carriage of the beading wheel. Fig. 7 is a sectional view on line 7—7 of Fig. 1. Fig. 8 is a detail view of stopping means. Fig. 9 is a detail view of the holding means for the work while being operated on. Fig. 10 is a diagrammatic view illustrating a feature of my invention. Fig. 11 is a diagram illustrating a form of compensator.

The operator places a tube in one of a pair of holders 1 carried at the upper end of a shaft 2 which shaft also carries a table 3 upon which the tube rests. This table has three successive movements, namely, downward, half revolution and upward.

The action of placing the tube in the holder squares it up and gives it a true shape. A head is then placed on the tube ready to be united therewith by the beading action. This having been done the table is depressed, as will be described presently, and it is then given a half turn, arrested, and then raised to present the can to a chuck 4, for the beading operation, the head of the can fitting around the said chuck for this purpose. While the machine is beading down the head of the tube, positioned as just described, the operator has ample time to remove the finished can from the other holder, which has now been moved around to the front, and to place new can parts in the said holder ready for the next rotary movement of the table and holders to carry these latter parts to the chuck and those just united away therefrom.

The table is depressed, together with the cans carried thereon, by a roller 5 on a lever 6 pivoted to the frame 7 at 8 and depressed by a cam 9 on a cam shaft 10 journaled in suitable bearings 11 in a bracket 12 secured to the frame, the said bracket having a bearing 13 through which the table shaft 2 passes. The roller 5 bears upon a collar 14 which is fixed to the table shaft and has diametrically arranged stops 15 to bear against the stop 16 depending from the bearing 13. When the collar with the table shaft and table is depressed it is freed from the fixed stop 16 and is now free to revolve, which takes place by a friction clutch member 17 splined to the shaft which is forced by the downward pressure communicated through a spring 18 into driving contact with the pulley 19 forming the other clutch member and running continuously, and ordinarily loosely, on the table shaft. The table shaft is journaled at its lower end in the frame.

The friction clutch member 17 consists of a sleeve surrounding the table shaft and having a disk shaped foot bearing on the pulley. The table turns until the opposite stop 15 comes in contact with the fixed stop 16 the cam 9 having allowed a slight rise of the table and collar 14 under the action of the spring 18 so that the table will be arrested immediately after it has presented the new can parts to the chuck to be operated on.

The table is arrested positively and solidly in its uppermost position by a stop sleeve 19' threaded on the shaft and thus vertically adjustable, it being fixed in any desired position by means of a jam nut 20'. This stop sleeve strikes the bearing 13 and by adjusting it up or down the upward movement of the table may be limited to accurately suit the size of can being operated on and when so limited the spring does not apply pressure to the table, said spring being merely an elevating means for the table.

The friction clutch is positive because it simply carries weight and does no driving and it slips loose easily when the table is raised and the weight of the spring 18 reduced. The pulley is used in preference to direct gearing as a driving means more especially as it aids to reduce speed of the table and preserves proper direction of revolution without additional parts. The table in turning as before stated carries the newly assembled can parts under the chuck 4 and under the rotary head 20 carrying the beading wheel 21 to be hereinafter described. The vertical movement of the table is, slight, only sufficient to clear the can from the chuck, and in seating a new can no time is lost in the parts starting to work. The spring about the sleeve not only serves to force the table upward against a positive stop, but also presses the friction member 17 against the continuously rotating pulley.

The can having been positioned against the stationary chuck is ready for the beading operation for which purpose the beading wheel 21 is provided, carried by an eccentric portion 22 of a pin 23 journaled in a block formed in two pieces 24, 24', Fig. 6, screwed together at 25. The pin 23 also carries a blank wheel 21' which always bears on the chuck when the beading wheel is retracted, while the beading wheel may be changed in relation to the said blank wheel and thus moved towards and from the chuck. The block 24, 24', is secured in any desired position on slide rods 27 by set screws 26, the said slide rods being fitted to reciprocate in brackets 28 and 29 depending from the gear wheel 30 which is in constant rotation from a gear 31 on an upright shaft 32 journaled in the frame. This gear wheel 30 of the head is arranged concentric with the vertical axis of the chuck which is supported rigidly by a center pin 33 fixed to and depending from a lateral extension 34 of the frame. A sleeve 35 surrounds the fixed center pin and this is connected by pins 36 with a compensator cam 37 for controlling the action of the beading wheel when operating, more especially upon cans other than circular and therefore having corners. The upper end of the sleeve has a gear wheel 38 fixed thereto driven through an idle gear 39, from a gear 40 on the upright shaft 32 before mentioned. This compensator has a roller 41 bearing thereon diametrically opposite the position of the beading wheel 21. This compensating roller is carried by a block 42 fitting in ways 43 on the inner side of the slide bars 27. The block 42 is not rigidly connected to the slide bars but may have an adjustment along the same, and it is provided with an upwardly extending projection 44 receiving a screw 45 projecting from a yoke 46, the ends of which are connected with the block 24, 24' by rods 47 of substantially S shape as shown in Fig. 3. Said rods are held to the block 24, 24' by the set screw 26 and by pins 48. The screw 45 has a nut 49 for adjustment and this screw is of a micrometer character and adjusts the mechanical distance between the compensating roller and beading wheel for the proper action of the parts. As before stated the block 24, 24' is secured to the slide rods 27 while the block 42 is connected to the block 24, 24' by the rods 47 and may have together with the compensating roller slight movement in relation to the beading roller owing to the natural elasticity of the yoke 46 and rods 47, thus giving the carriage which comprises these parts an elastic quality within itself to allow for any inequalities in the work. The gear wheel 30 forming the main element of the rotary head, and having thereon the sliding carriage for the beading wheel and compensating roller, is supported by a ring 50 which is in turn supported on the frame of the machine by a bracket comprising radial arms 52 and a forked piece 51, the latter being secured by bolts 53 to the main frame. A ring 54 is secured by bolts 55 to the gear wheel and bears upon the ring 50 thus supporting the gear wheel vertically but allowing it to have free rotary movement. A screw 56 extending down from the frame into an arm 51' of the gear supporting bracket, has a differential thread. The upper end, for instance, has 15 threads to the inch and the lower end 12 threads to the inch, so that a fine adjustment of the head vertically may be obtained. As the head, comprising the gear with the sliding carriage thereon rotates, the compensating roller acted on by the compensator will impart to the carriage a reciprocating movement to cause the blank wheel or the beading wheel to follow accurately the irregular shape of the can.

I am aware that it is not new to combine a chuck, a beading wheel and a compensator, with the compensator and chuck both revolving alike. In such instance the compensator formed is practically the reverse of the chuck.

In my present invention I have sought to simplify the form of the compensator and render its action more certain and effective, and I have found that by giving the compensator a differential action in respect to the chuck, the compensator is not the reverse in form of the chuck, may be reduced in size and is made simple in form and without depressions. For instance a compensator, of this differential character, adapted to operate with a can oblong in cross section, becomes a simple pear shape, the outline of which is free from depressions or sharp irregularities. In the case of a square can the differential compensator assumes substantially the form of a circle centered eccentrically and in all shapes of chucks excepting perfect circles the compensator is simplified by making it differential in its action in respect to the chuck, that is to say, by revolving the compensator a plurality of times in respect to the beading device.

In my present embodiment of the differential compensator it will be seen that the chuck is stationary and the compensator rotates. Further I make the compensator differential in its revolution in respect to the revolution of the beading wheel around the axial center of the chuck, the said compensator making a plurality of revolutions to each revolution of the beading wheel around the chuck. As shown in Fig. 4 the can being operated on, indicated at 57, is of square cross sectional form. The compensator is of substantially circular form centered eccentrically, the speed ratio in this instance being one to four. This compensator makes four revolutions to one revolution of the beading wheel about the axial center of the chuck and thus for each revolution of the compensator the beading wheel will operate upon one quarter of the can. By the use of this differential compensator erratic actions of the parts are eliminated and the speed of the machine can consequently be increased.

Of course it will be understood that I do not wish to limit myself to any particular relative arrangement or action as between the compensator, chuck and beading wheel. I may, as shown in Fig. 10, for instance, use the compensator in connection with a rotary chuck and a non-rotating beading wheel, the beading wheel 58 being carried by a lever 59 pivoted at 60 intermediate of its length and carrying on its opposite end a compensating roller 61 bearing on the compensator 62. In this instance the compensator makes two revolutions to the can's one revolution. As before stated this differential quality simplifies the compensator by taking out hollows or sharp irregularities and enables it to be lessened in size, and the differential feature may be carried out in various ways without departing from the spirit of my invention. To be concise, a revolving chuck with a still wheel turning only on its axis and reciprocating to and from its chuck, is the mechanical equivalent of a still chuck with beading wheel revolving about it. A chuck and compensator revolving at same speed, that is in unison, with still wheels,—or a still chuck, revolving wheel and compensator revolving in unison,—or a chuck and compensator both still with wheels adapted to revolve around them, as in a channel of like form, are not differential in compensating action. The feature I call "differential compensation", is obtained by giving one member of the compensating device a plurality of revolutions in relation to the other, as may be plainly seen from Fig. 10, the compensator therein being generated by a ratio of two revolutions of the compensator to one of the chuck, the compensator thus representing one half a revolution of the chuck. At Fig. 11 is shown the outline of the erratic compensator which would be generated by a uniform speed ratio of the same arrangement shown in Fig. 10. The compensator approximately shown in Fig. 4 is generated by a 1 to 4 ratio.

In order to control the position of the beading wheel towards and from the head automatically the eccentric pin carrying it is provided with a lever 63 adapted to work around a segment 64 on the block 24, 24', the said segment carrying latches 64', 64", to engage a pin 65 on the lever and said latches being pressed outwardly by springs 66, dotted lines, Fig. 4, and pressed inwardly to release the arm by triggers 67 pivoted at 68 and engaging pins 69 on the latches to force them back, when the said triggers strike a dog 68' carried by an arm 69' pivoted to the frame and raised and lowered by a rod 70 passing through a guide 71 on the frame and resting upon a cam 72 on the cam shaft 10.

Referring to Fig. 4 and supposing the setting arm 63 of the beading wheel is in the position shown in full lines and held by one of the latches 64' the beading wheel will be now standing to the full limit of its distance away from the chuck. The revolving head may now be said to be open for the introduction of the assembled can parts and the dog 68' has been automatically adjusted by its cam to engage with the triggers 67 as they are brought around by the revolution of the head. The setting arm 63 is released as soon as the trigger forces back the latch which is now holding it, and the setting arm flies around the center of the pin 23 until it engages the next latch 64". For this purpose a spring 69$^\times$ bears upon the setting arm 63, said spring being bent around pins 70$^\times$ carried by the block 24, 24'. The movement of the setting arm under the action of this spring causes the eccentric portion of the pin 23 to partly set up the beading wheel against the can. At the next revolution of the head the dog 68' again engages the triggers and releases the setting arm from the latch 64", allowing the spring 69$^\times$ to again exert its force to move the setting arm around the segment, it being materially assisted in this movement by the running action of the beading wheel on the can, which tends to give the parts a toggle action and force the beading wheel with the desired pressure against the can, this being limited by the setting arm coming against the stop 71× on the segment, as shown in dotted lines in Fig. 4. In this position of the parts the head makes two revolutions, the beading wheel being fully set up to the work during this time. As shown in Fig. 3 the setting arm 63 and the triggers are in different horizontal planes and in the action thus far described the dog has been in position to operate the triggers but not the setting arm. After the two revolutions have been finished with the beading wheel fully set up to the work, the dog 68' is lowered automatically by its cam, so that the further revolution of the head will bring the said arm 63 against the dog, pushing it to the position shown in full lines in Fig. 4, to what may be called the normal or open position of the head, that is to say, with the beading wheel fully retracted. This completes the cycle of operation of the head, and in beginning a new cycle the head makes one revolution open during which time the new assembled can parts are positioned, and the actions above described are repeated.

It will be understood that the spring 69× is shown in the form and arrangement illustrated in the drawing, for convenience of illustration. This spring may be arranged in any suitable way and may be of any desired form to apply the necessary tension to the arm 63 as will be clear to any person of ordinary skill.

It will be understood that when the setting arm is moved into the position shown in full lines in Fig. 4 by the dog, it simply slips by the said dog and then the dog is adjusted automatically out of the plane of the setting arm and into the plane of the triggers. It will be understood that while the machine as described is timed to make four revolutions of the head during each cycle, one being open for feeding, one partly open and two closed, it may be arranged for any number of revolutions and a series or proportion of any number of stages in setting the beading wheel fully up to the work.

The complete cycle of the machine may be said to commence with the head open, the beading wheel retracted and the can in position. It then proceeds thus:—The beading wheel partly closes, the wheel full set, wheel full retracted, table depressed, table revolves, table rises, and the movement is completed with newly assembled can parts in position and the finished can delivered to the front of the machine to be taken off by the operator and replaced by can parts to be united.

The machine may be adapted for use with plain shapes of cans such as those square in cross section or those circular in shape as well as irregular, such as those oblong in cross section. It will be seen that the head revolves continuously and its rate of revolution and the travel of the beading wheel is less for the same amount of work in a given time than would be the case were the head made intermittent in its action. The cam shaft 10 is driven by a worm wheel 74 thereon from a worm 75 on the upright shaft 32, which is in turn driven from a pulley 76 through bevel gearing 77. The clutch pulley 19 for driving the feed table, is driven by a belt from the pulley 78 on a shaft 79 journaled in the base frame and rotated through gearing 80 on the shaft 32. The shaft 32 is connected with the loose driving gear 77 by a suitable clutch 82 beneath it, the said clutch being under the control of the operator by a treadle 83 connected with the clutch by rods 84. The chuck and the beading wheel are each beading members and as above described either may revolve while the other is relatively fixed.

I claim as my invention:

1. In combination, a chuck, a beading wheel and compensating means comprising a cam having a differential movement in respect to the chuck, substantially as described.

2. In combination, a stationary chuck, a beading wheel and a revolving compensator cam, substantially as described.

3. In combination, a chuck and beading wheel and compensating means comprising a cam having a differential movement in respect to both of the said parts, substantially as described.

4. In combination, a revolving beading member and a compensator having a plurality of revolutions to each revolution of the beading member, substantially as described.

5. In combination, a stationary chuck, a beading wheel revolving about the same and a revolving compensator controlling the action of the beading wheel, substantially as described.

6. In combination with a chuck, a revolving head, a beading wheel and compensating means carried thereby, and revolving substantially as described.

7. In combination with a chuck for holding cans having corners, a beading wheel and a compensator consisting of a body having a plane curved edge, every part of which is substantially convex in relation to the axis of the compensator and free from hollows, said compensator controlling the action of the beading wheel, substantially as described.

8. In combination, a chuck, a revolving head, a beading wheel carried thereby and a revolving compensator cam having a differential movement in respect to the chuck, substantially as described.

9. In combination, a chuck, a revolving head, a beading wheel carried thereby and a compensator having a plurality of revolutions in respect to the head and beading wheel, substantially as described.

10. In combination, a chuck, a revolving head, a radially reciprocating carriage thereon revolving therewith, a beading wheel on the carriage and a compensator cam for controlling the movement of the carriage, substantially as described.

11. In combination, a fixed chuck, a revolving head, a radially reciprocating carriage guided on the lower side of the head revolving therewith, a beading wheel on the carriage, a revolving compensator cam and a driving spindle therefor extending up through the head, substantially as described.

12. In combination, a fixed chuck, a beading wheel, a carriage for the beading wheel, a revolving head on which said carriage reciprocates, a compensator, a compensator roller, said carriage comprising therein connections between the roller and the beading wheel consisting of the bars and the yoke, substantially as described.

13. In combination, a chuck, a revolving head, a carriage reciprocating radially thereon, a beading wheel on the carriage, a compensating roller and adjustable connections between the roller and the beading wheel, substantially as described.

14. In combination, a chuck, a revolving head, a carriage reciprocating thereon comprising bars arranged to slide in bearings on the head, a block fixed to the bars, a block movably supported by the bars, connections between the two blocks adapted to allow a variation in the relation between them, and a compensator roller and beading wheel carried respectively by the said movable and fixed blocks with compensating means to act on the said roller, substantially as described.

15. In combination, a chuck, a rotary head comprising a gear wheel above the chuck, a beading wheel carried by the said head and means for supporting the head consisting of the ring shaped bracket and the ring on the gear wheel fitted thereupon, substantially as described.

16. In combination with a chuck, a blank wheel running constantly on the chuck and a beading wheel adjustable towards and from the chuck, substantially as described.

17. In combination, with a chuck, a compensator, a blank wheel running constantly on the chuck, a connection between the said blank wheel and compensator, a beading wheel controlled by the blank wheel and means for adjusting the beading wheel independently of the blank wheel and in relation to the chuck, substantially as described.

18. In combination, with a chuck, a blank wheel, a beading wheel, a pin on which the wheels are carried, the said pin having an eccentric portion engaging the beading wheel and means for turning the pin to adjust the beading wheel towards and from the chuck, substantially as described.

19. In combination, a chuck, a rotary head, a beading wheel carried by the head compensating means to control the position of the beading wheel and automatic means for moving the beading wheel towards and from operative position in relation to the chuck, substantially as described.

20. In combination, a chuck, a rotary head, a beading wheel carried by the head compensating means to control the position of the beading wheel and automatic means for moving the beading wheel towards and from operative position in relation to the chuck, said means being rendered effective by the revolution of the head, substantially as described.

21. In combination, a chuck, a rotary head, a beading wheel carried thereby and moving towards and from operative position in relation to the chuck, compensating means to control the position of the beading wheel, means located at one point in the revolution of the head for controlling the position of the beading wheel and automatically operating devices for controlling said means, substantially as described.

22. In combination, a chuck, a rotary head, a beading wheel thereon, an eccentric pin for setting the beading wheel towards and from the head, an arm connected with the eccentric pin, means in the path of the arm to operate the same as the head revolves, substantially as described.

23. In combination, a chuck, a beading wheel, a revolving head carrying the same and means for giving a step by step setting up movement to the beading wheel as the head revolves, substantially as described.

24. In combination, a chuck, the beading wheel, a revolving head carrying the same and means for giving a step by step setting up movement to the beading wheel as the head revolves, said means including an arm, a plurality of latches, triggers controlling the same, and means for operating the said triggers, substantially as described.

25. In combination, a chuck, the rotary head, a beading wheel carried thereby, means for moving the said beading wheel towards and from the chuck, and a controlling dog with automatic means for setting the same in different positions, said dog in one position causing the setting up of the beading wheel and in another position causing its retraction, substantially as described.

26. In combination, a chuck, a revolving head, a beading wheel, an eccentric pin having an arm, latch mechanism for holding the said arm, a dog, and automatically operating means for adjusting the said dog to operate first the latch mechanism for causing the beading wheel to be set up to its work and for then operating the arm to cause the retraction of said beading wheel, substantially as described.

27. In combination with the chuck and beading wheel, a table for holding the can tubes and means for giving the said table a rotary step by step movement and a vertical movement, substantially as described.

28. In combination with a beading wheel and chuck, a table, a cam and lever for forcing the table downward, a spring for forcing the table upward and a stop for limiting the upward movement of the table, substantially as described.

In testimony whereof, I affix my signature in presence of two witnesses.

HENRY C. X HUNTER.
his mark

Witnesses:
HENRY L. REYNOLDS,
ERNEST E. MATHISON.